US012659644B2

(12) United States Patent
    Mitchell

(10) Patent No.:  US 12,659,644 B2
(45) Date of Patent:     Jun. 16, 2026

(54) HEADSET SUPPORTING RADIO FREQUENCY BROADCAST SIGNALS AND BLUETOOTH AND RELATED SYSTEMS AND METHODS

(71) Applicant: Party Headphones, LLC, Tucson, AZ (US)

(72) Inventor: Alec Mitchell, Tucson, AZ (US)

(73) Assignee: PARTY HEADPHONES, LLC, Tucson, AZ (US)

( * ) Notice: Subject to any disclaimer, the term of this patent is extended or adjusted under 35 U.S.C. 154(b) by 212 days.

(21) Appl. No.: 18/383,387

(22) Filed: Oct. 24, 2023

(65) Prior Publication Data

US 2025/0133323 A1     Apr. 24, 2025

(51) Int. Cl.
  H04R 1/10        (2026.01)
  F21V 33/00       (2006.01)
  H04B 1/03        (2006.01)

(52) U.S. Cl.
  CPC ....... H04R 1/1041 (2013.01); F21V 33/0056 (2013.01); H04B 1/03 (2013.01); H04R 1/1008 (2013.01); H04R 1/105 (2013.01); H04R 2420/07 (2013.01)

(58) Field of Classification Search
  CPC .... H04R 1/1041; H04R 1/1008; H04R 1/105; H04R 1/10; H04R 1/1066; H04R 2420/07; H04R 5/033; H04R 5/0335; H04R 2205/022; F21V 33/0056; H04B 1/03
  USPC .......................................... 381/74, 370, 378
  See application file for complete search history.

(56) References Cited

U.S. PATENT DOCUMENTS

| | | | | |
|---|---|---|---|---|
| 2003/0236075 A1* | 12/2003 | Johnson | ................. | H04B 1/034 |
| | | | | 455/99 |
| 2010/0048134 A1* | 2/2010 | McCarthy | ............ | H04R 1/1041 |
| | | | | 455/41.3 |
| 2011/0150249 A1* | 6/2011 | Klemmensen | ....... | H04R 25/554 |
| | | | | 381/312 |
| 2013/0315417 A1* | 11/2013 | Christie | ................. | H04H 20/86 |
| | | | | 381/80 |
| 2016/0165690 A1 | 6/2016 | Benattar | | |

(Continued)

FOREIGN PATENT DOCUMENTS

| | | |
|---|---|---|
| CN | 201967090 U | 9/2011 |
| CN | 106954111 A | 7/2017 |

(Continued)

OTHER PUBLICATIONS

Shenzhen Go-On Electronics, "TX-50RF wireless silent disco transmitter with RF frequency," retrieved from https://www.headphone-manufacturer.com/products/TX-50RF-wireless-silent-disco-transmitter-with-RF-frequency.html on Jul. 10, 2025 (Year: 2025).*

(Continued)

*Primary Examiner* — Ahmad F. Matar
*Assistant Examiner* — Sabrina Diaz
(74) *Attorney, Agent, or Firm* — BRYAN CAVE LEIGHTON PAISNER LLP

(57)          ABSTRACT

A system including a headset including a left ear assembly, a right ear assembly, a headband connecting the left ear assembly and the right ear assembly, and a switch configured to toggle the headset between a first mode for receiving radio frequency (RF) broadcast signals and a second mode for receiving Bluetooth signals. Other embodiments are described.

7 Claims, 5 Drawing Sheets

(56) References Cited

U.S. PATENT DOCUMENTS

| | | | |
|---|---|---|---|
| 2016/0191093 A1* | 6/2016 | Larsen ................ | H04M 1/6066 |
| | | | 455/41.2 |
| 2018/0206013 A1 | 7/2018 | Imamura | |
| 2018/0367295 A1 | 12/2018 | Papadopoulos et al. | |
| 2019/0191246 A1 | 6/2019 | Born | |
| 2019/0200130 A1* | 6/2019 | Richardson ........ | G06Q 30/0645 |
| 2023/0082116 A1* | 3/2023 | Park ....................... | H04R 3/005 |
| | | | 381/17 |

FOREIGN PATENT DOCUMENTS

| | | | |
|---|---|---|---|
| CN | 108900981 A | 11/2018 |
| CN | 210075543 U | 2/2020 |
| CN | 211529605 U | 9/2020 |
| CN | 114786095 A | 7/2022 |
| GB | 2575430 A | 1/2020 |
| GB | 2576966 A | 3/2020 |
| GB | 2598326 A | 3/2022 |
| WO | 2023027407 A1 | 3/2023 |

OTHER PUBLICATIONS

Gab L, "6 Best Silent Disco Headphones," published by Headphonesty, retrieved from https://www.headphonesty.com/2022/02/best-silent-disco-headphones/ Jan. 6, 2023.

Retekess TA003 TA004 Silent Disco System Silent Disco Headphones and Transmitter for Parties or Classes, retrieved from https://www.retekess.com/ta004-silent-disco-headphones/#F9610AX1-F9610BX9 Aug. 28, 2023.

Partyheadphones.com, Silent Disco Headphones Bluetooth Transmitter with Microphone, retrieved from https://partyheadphones.com/product/silent-disco-bluetooth-transmitter/ Aug. 28, 2023.

Silent Discotheque, Portable silent disco transmitter, retrieved from https://www.silentdiscotheque.com/product/portable-silent-disco-transmitter Aug. 28, 2023.

Camp Ckids.Org, Silent Disco Set—20 headphones, retrieved from https://camp.ckids.org/product-page/silent-disco-set-20-headphones Aug. 28, 2023.

* cited by examiner

700

PROVIDING A HEADSET —710

PROVIDING A TRANSMITTER —720

HEADSET SUPPORTING RADIO FREQUENCY BROADCAST SIGNALS AND BLUETOOTH AND RELATED SYSTEMS AND METHODS

TECHNICAL FIELD

This disclosure relates generally to audio headsets, and relates more particularly to headsets supporting radio frequency (RF) broadcast signals and Bluetooth.

BACKGROUND

Silent disco refers to an event where people party to music transmitted and heard through wireless headphones instead of loudspeakers. The concept gained traction as a way to lessen noise pollution and bypass sound curfews. Conventional headsets used in silent disco events are often limited in their capabilities.

BRIEF DESCRIPTION OF THE DRAWINGS

To facilitate further description of the embodiments, the following drawings are provided in which.

Figures 1, 2:
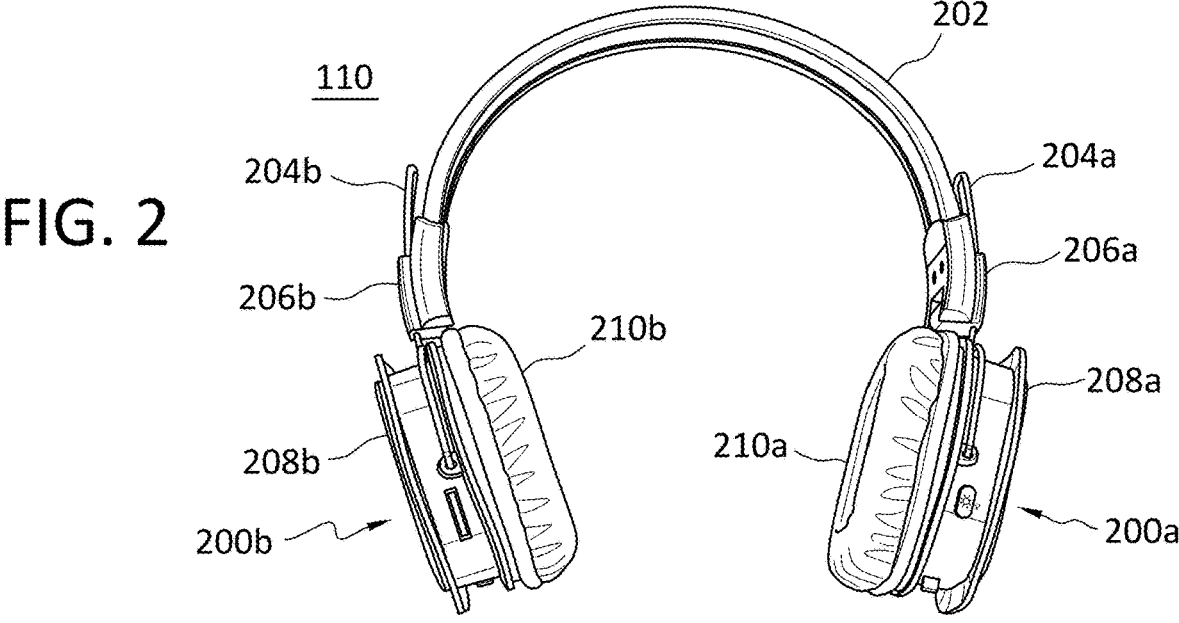
FIG. 1 illustrates a perspective view of a system comprising a headset and/or a transmitter.
FIG. 2 illustrates a rear elevational view of the headset of FIG. 1.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a system including a headset including a left ear assembly, a right ear assembly, a headband connecting the left ear assembly and the right ear assembly, and a switch configured to toggle the headset between a first mode for receiving radio frequency (RF) broadcast signals and a second mode for receiving Bluetooth signals.

A number of embodiments include a method of providing a headset. The headset can include a left ear assembly, a right ear assembly, a headband connecting the left ear assembly and the right ear assembly, and a switch configured to toggle the headset between a first mode for receiving radio frequency (RF) broadcast signals and a second mode for receiving Bluetooth signals.

Turning to the drawings, FIG. 1 illustrates a perspective view of a system 100 comprising a headset (e.g., headset 110) and a transmitter 150. System 100, headset 110, and transmitter 150 are merely exemplary, and embodiments of the system, headset, and transmitter are not limited to embodiments presented herein. The system, headset, and transmitter can be employed in many different embodiments or examples not specifically depicted or described herein. Headset 110 can include a pair of earphones joined by a headband, for listening to audio signals such as music or speech. Transmitter 150 can be used to transmit audio signals to one or more headsets (e.g., headset 110), and the transmitter can be set to transmit through RF broadcast signals, and/or can receive audio inputs from wired connections (e.g., RCA audio inputs or other suitable audio inputs) and wirelessly through Bluetooth. Transmitter 150 can make an AV (audio/visual) device with a headphone jack (or other type of audio output) compatible with a Bluetooth audio source device. The transmitted can receive the audio wirelessly from the audio source device through Bluetooth, decode the information into a transferable format, and then send broadcast the audio signal over RF. RF is the oscillation rate of an alternating electric current or voltage or of a magnetic, electric or electromagnetic field or mechanical system in the frequency range from around 20 kHz to around 300 GHz. UHF (ultrahigh-frequency) broadcasting is the use of UHF radio for over-the-air transmission of television signals. UHF frequencies are used for both analog and digital television broadcasts.

FIG. 2 illustrates a rear elevational view of headset 110. In many embodiments, headset 110 can include a right ear assembly 200*a*, a left ear assembly 200*b*, and/or a headband 202 connecting right ear assembly 200*a* and left ear assembly 200*b*. In a number of embodiments, right ear assembly 200*a* can include ear pad 210*a* and LED panels 208*a*, and/or left ear assembly 200*b* can include ear pad 210*b* and LED panels 208*b*. Right ear assembly 200*a* can be adjustable with respect to headband 202 via a clip 204*a* that is configured to adjustably slide within a slider 206*a*. Similarly, left ear assembly 200*b* can be adjustable with respect to headband 202 via a clip 204*b* that is configured to adjustably slide within a slider 206*b*. Together, clips 204*a,b* and sliders 206*a,b* allow for sliding and adjusting headband 202 according to user preferences for a comfortable fit on the user's head. Ear pads 210*a,b* can provide over-ear or on-ear cushioning, fit, and comfort placement of ear assemblies 200*a,b* on the user's head around the user's ears. In some embodiments, ear pads 210*a,b* can be packed with layers of high-density foam or other sound-absorbing materials, which can make them heavier than conventional headphones. Headband 202 can be made of silicone or another suitable material, and can provide on-head stability for over-the-ear functionality and comfort. Clip 204*a* can be an adjustable metal wing allowing fit over the ear for various head shapes and sizes. In many embodiments, sliders 206*a,b* can fold with respect to headband 202 to allow ear assemblies 200*a,b* to be folded inward for compact and/or durable storage of headset 110.

Figures 3, 4A:
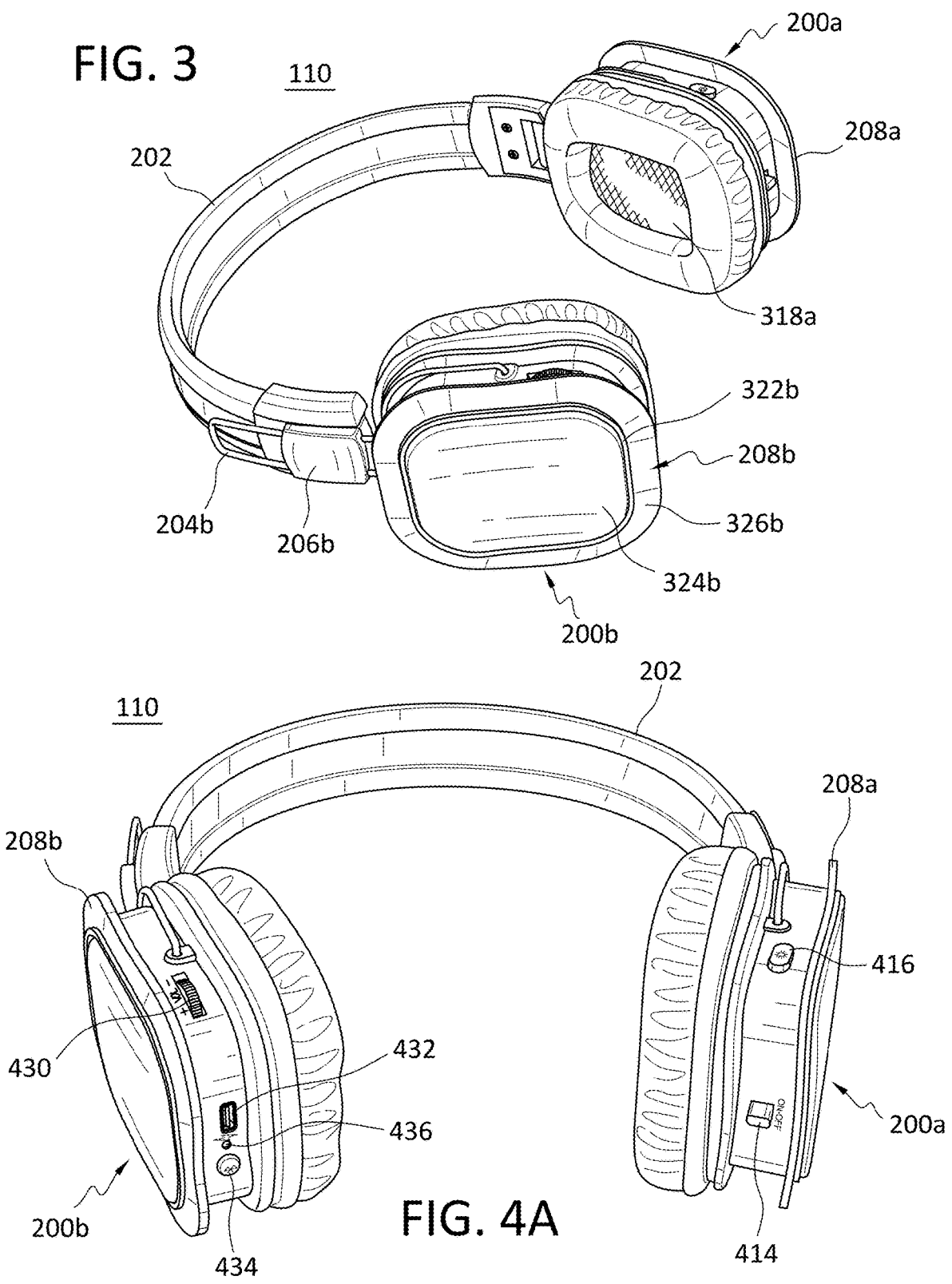
FIG. 3 illustrates a left side perspective view of the headset of FIG. 1.
FIG. 4A illustrates a bottom side perspective view of the headset of FIG. 1.

FIG. 3 illustrates a left side perspective view of headset 110. In many embodiments, LED panel 208*b* can include LEDs 322*b*, an outer panel 324*b*, and/or an illumination panel 326*b*. LED panel 208*a* can include similar or identical components. In a number of embodiments, LED panels 208*a,b* can be configured to display various lights, such as lights that are based on frequency or reactive to the audio signal. LED panel 208*b* can change color based on the channel to which headset 110 is set.

In many embodiments, right ear assembly 200*a* can include a speaker 318*a*, which can produce sound output. Left ear assembly 200*b* can include a similar speaker. The speakers can allow the user of headset 110 to listen to high-resolution audio received by RF from transmitter 150, through a wired input, and/or wirelessly from a Bluetooth source.

FIG. 4A illustrates a bottom side perspective view of headset 110. Headset can include various controls, inputs, and/or indicators, and a power switch 414 and a channel button 416, as shown on right ear assembly 200*a*, and a volume wheel 430, a USB-C (Universal Serial Bus type C)

port 432 a Bluetooth button 434, a Bluetooth connectivity indicator 436, as shown on left ear assembly 200*b*.

Power switch 414 can turn on or off headset 110. Channel button 416 can be used to change the RF channel, such as to cycle through the RF channels 1-10. In a number of embodiments, headset 110 can include phase-locked loop technology that allows headset 110 and transmitter 150 (FIG. 1) to communicate via various RF frequencies. These frequencies show up as channels. In some embodiments, headset 110 can auto-scan the RF airwaves for multiple RF channels and automatically land on the correct one based on what is being transmitted out of transmitter 150. In a number of embodiments, when the channel is changed, or when headset 110 auto-finds a channel, the channel number can be vocally indicated through the speaker (e.g., 318*a*). In a number of embodiments, headset 110 can support UHF bands and RF frequency.

Phase-locked loop technology is a control system that generates an output signal whose phase is related to the phase of an input signal. There are several different types; the simplest is an electronic circuit including a variable frequency oscillator and a phase detector in a feedback loop. The oscillator's frequency and phase are controlled proportionally by an applied voltage, hence the term voltage-controlled oscillator (VCO). The oscillator generates a periodic signal of a specific frequency, and the phase detector compares the phase of that signal with the phase of the input periodic signal, to adjust the oscillator to keep the phases matched.

Volume wheel 430 can be used to directly control the volume output through the speakers (e.g., 318*a*), which can provide an additional or alternative way to control the volume other than via the audio source. USB-C port 432 can be used to connect a wired audio source (e.g., an AUX compatible port) and/or to provide power to headset 110 to charge its internal battery (not shown) using a compatible USB-C charging cord. Bluetooth button 434 can turn on/off Bluetooth mode and/or control Bluetooth pairing on headset 110. When Bluetooth mode is turned on, headset 110 can be paired with a Bluetooth audio source device (e.g., mobile phone, computer, etc.), and the audio from such audio source device can be played on the speakers (e.g., speaker 318*a*). Bluetooth connectivity indicator 436 can display the power, pairing, and/or connectivity status of the Bluetooth mode. When Bluetooth mode is turned off, headset 110 can use another audio source, such as audio received over RF or through USB-C port 432.

Figure 4B:
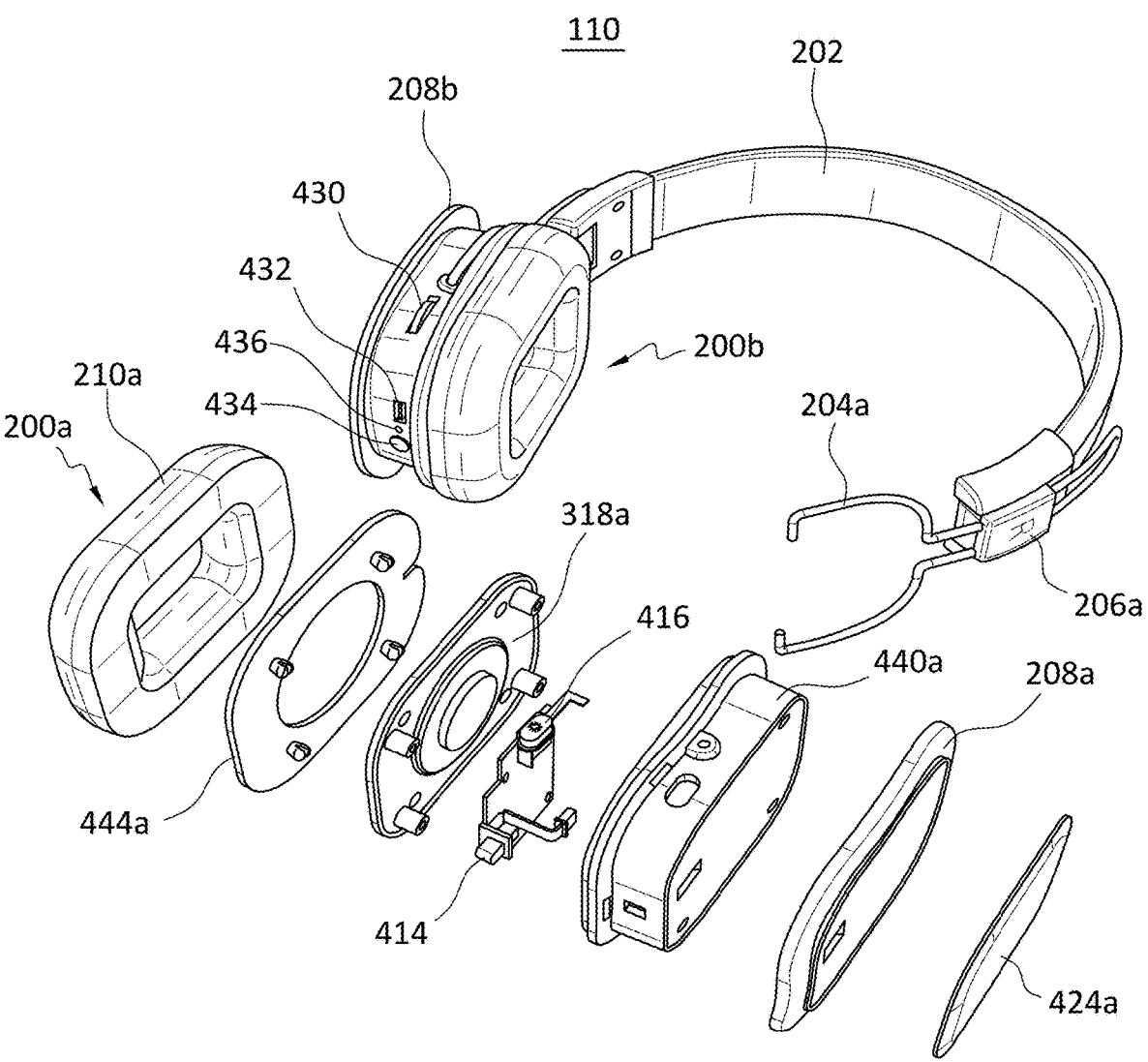
FIG. 4B illustrates a perspective view of the headset of FIG. 1 with an exploded view of the right ear assembly detached from the clip.

FIG. 4B illustrates a perspective view of headset 110 with an exploded view of right ear assembly 200*a* detached from clip 204*a*. As shown in FIG. 4B, right ear assembly 200*a* can include ear pad 210*a*, removable earmuff connector 444*a*, speaker 318*a*, power switch 414, channel button 416, speaker housing 440*a*, LED panel 208*a*, and/or an outer panel 424*a* (which can be similar to outer panel 324*b*). Left ear assembly 200*b* can include components that are similar or identical to the components of right ear assembly 200*a*. Removable earmuff connector 444*a* can allow for convenient replacement of ear pad 210*a* or repair of right ear assembly 200*a*. Outer panel 424*a* can display a logo, a symbol, instructions, a design, or other suitable content.

Speaker housing 440*a* can house internal components of right ear assembly 200*a*, such as speaker 318*a*, circuitry for various functionality, such as volume control, Bluetooth control and/or functionality, USB-C charging and/or connectivity functionality, RF receiver functionality, and/or other suitable functionality. For example, the Qualcomm QCC3044 chipset can be included, which can provide low power consumption with active noise cancelation (ANC) and apex adaptive audio. ANC is a method of reducing unwanted background sounds to provide a better listening experience by adding a second sound to negate them. ANC uses a combination of microphones, to detect ambient sounds and speakers, to generate an inverted sound wave of the same amplitude. In a number of embodiments, the headsets can provide music reception with zero or near-zero external noise. ANC can be processed through an ANC chipset using either a feed-forward ANC system that has a microphone placed on the outside of the earphone, or a feedback ANC system has a microphone that is placed on the inside of the earphone.

In many embodiments, headset 110 can provide high efficiency and digital ANC with low power consumption. In some embodiments, headset can allow usage in an approximately 10-15 hour time period without interruption, depending on function. For example, a 3.7V 600 mAh lithium-ion battery can be used, which can provide in rechargeability, and can be thin and lightweight, and can be charged and discharged more than 500 times and still retain 80% of the original capacity. The battery can be built-in with anti-short circuit, over-current device, safe explosion-proof and no bulging, in accordance with international safety standards. In some embodiments, UHF mode features lower power consumption than Bluetooth listening mode, which can allow users a longer listening experience.

In a number of embodiments, LED panels 208*a,b* in Bluetooth mode can have controllable colors that can change based on the sound of the music. There can be a strobing effect according to the frequency of the sound integrated with the channels. This sound-activated light can change the color and orientation of the LEDs based on sounds picked up by an internal microphone, which can provide a light that reacts to the sounds around it and produces a strobing effect matching the bass beat of the music being played. When in Bluetooth mode, the user can have the ability to change the color of the LED through channel button 416 on the headset. For example, each channel can be associated with a different color. In some embodiments, the color displayed on headset 110 can be based on the mode of operation. In some embodiments, the display of colors can be based on the reception of RF signals. For example, UHF frequency can determine pre-set color codes in the headset. Each channel can result in a different LED color being displayed on LED panels 208*a,b* of headset 110 while being used in Bluetooth mode or silent disco (RF) mode.

In some embodiments, stroboscopes flicker a light at the same frequency as the note. The light shines on a wheel that spins at a precise speed. The interaction of the light and regularly-spaced marks on the wheel creates a stroboscopic effect that makes the marks for a particular pitch appear to stand still when the pitch is in tune. These stroboscopes can tune instruments and audio devices more accurately than most non-strobe tuners. However, mechanical strobe units are expensive and delicate, and their moving parts involve periodic servicing, so they are used mainly in applications that demand higher precision, such as by professional instrument makers and repair experts. There are three types of strobe tuners: the mechanical rotating disk strobe tuner, an LED array strobe in place of the rotating disk, and "virtual strobe" tuners with LCDs or ones that work on personal computers. A strobe tuner shows the difference between a reference frequency and the musical note being played. Even the slightest difference between the two shows up as a rotating motion in the strobe display. The accuracy of the tuner is limited by the internal frequency generator. The strobe tuner detects the pitch either from a TRS input jack or a built-in or external microphone connected to the tuner.

In some embodiments, AI integration in headset 110 can allow the user to hear what function is being played on the headset, what channels are being accessed on the headset, and if the headset is powered on. In some embodiments, the headsets can be integrated with voice artificial intelligence to provide vocal audio alerts on the speakers (e.g., 318*a*) during situations such as but not limited to changing the channel number, powering on or off the headset, turning on or off Bluetooth mode, Bluetooth pairing, connectivity status of Bluetooth, alerting lower power status, etc. AI integrations can allow a more user-friendly experience when headsets are being used.

In some embodiments, headset 110 can support multi-channel RF abilities for receiving signals in a first mode and support Bluetooth for receiving Bluetooth signals, such as from a personal audio source device, in a second mode. The modes can be toggled using Bluetooth button 434.

In some embodiments, headset 110 can include various features, such as faster charging time, ability to pick up 10 channels instead of 3, individual Bluetooth connectivity, QC3044 Bluetooth chip (operates at low power to increase battery duration and faster connectivity), reactive LED lighting, IPX 4 rated (ingress protection from splashing water, regardless of direction), ease of use, RF channel scanning, removable ear muffs, and better aesthetic appearance (without screws).

Figure 5:
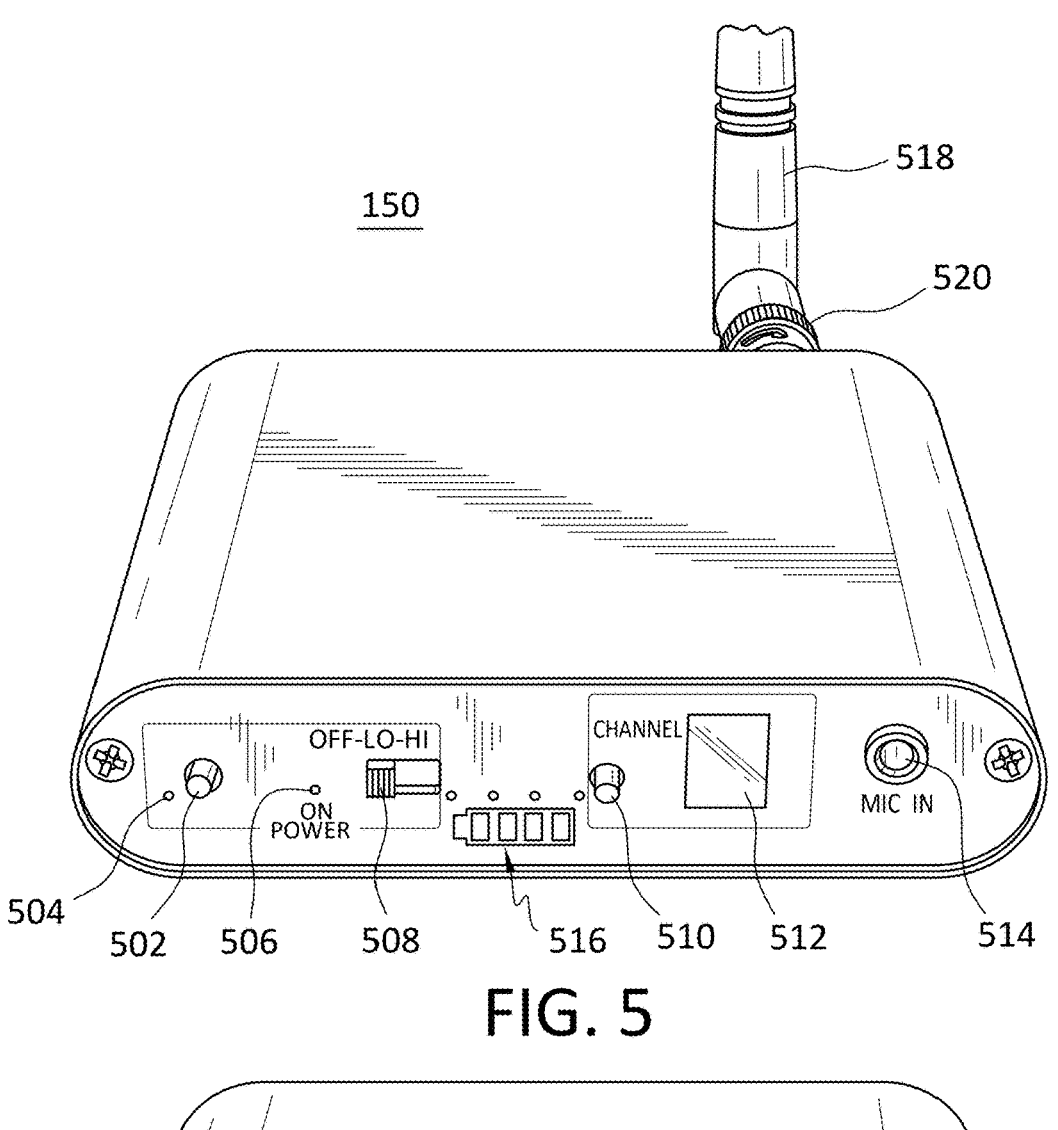
FIG. 5 illustrates a front, top perspective view of the transmitter of FIG. 1.
Figure 6:
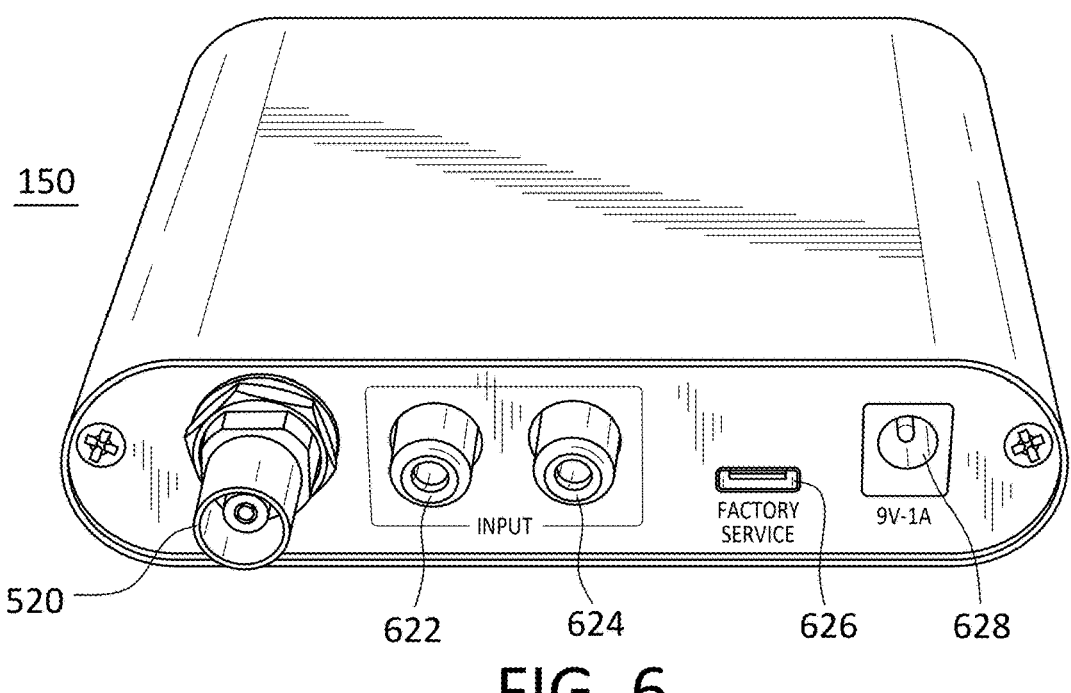
FIG. 6 illustrates a rear, top perspective view of transmitter of FIG. 1.

Turning ahead in the drawings, FIG. 5 illustrates a front, top perspective view of transmitter 150. FIG. 6 illustrates a rear, top perspective view of transmitter 150. In many embodiments, as shown in FIGS. 5-6, transmitter 150 can include a Bluetooth button 502, a Bluetooth indicator 504, a power indicator 506, a power switch 508, a battery indicator 516, a channel button 510, a channel display 512, a mic input port 514, an antenna port 520, an antenna 518 (partially shown in FIG. 5), RCA left input port 622, RCA right input port 624, USB-C port 626, and/or a power adapter port 628.

Power switch 508 can turn on/off transmitter 150 and/or control the transmission level of transmitter 150. Battery indicator 516 can be display the power level of a built-in battery in transmitter 150, which can allow for playing without direct external power sources. Power adapter port 628 can be used to provide power to transmitter 150, such as through a power adapter.

Bluetooth button 502 can turn on/off Bluetooth mode and/or control Bluetooth pairing on transmitter 150. When Bluetooth mode is turned on, transmitter 150 can be paired with a Bluetooth audio source device (e.g., mobile phone, computer, etc.), and the audio from such audio source device received by transmitter 150 can be decoded and transmitted over RF signals, such as to headset 110 (FIGS. 1-4B). Bluetooth indicator 504 can display the power, pairing, and/or connectivity status of the Bluetooth mode. When Bluetooth mode is turned off, transmitter 150 can use another audio source, such as audio received through RCA audio input ports 622 and 624.

Channel button 510 can allow the user to change the RF channel on which the audio signal is broadcast using antenna 518, such as to cycle through channels 1-10. Channel display 512 can display the current channel setting. In some embodiments, multiple transmitters (e.g., 150) broadcasting on different channels to multiple headsets (e.g., 110) can allow the users of the headsets to select which channel on which to listen to different audio sources. In some embodiments, the transmitter can auto-scan for finding an RF channel with the lowest interference, which can be supported by an audio codec. The audio codec can automatically adjust to provide optimum audio quality or latency depending on what audio content is being played on the device while also taking into account the external RF environment to provide robustness. An audio codec is a device or computer program capable of encoding or decoding a digital data stream that encodes or decodes audio. In software, an audio codec is a computer program implementing an algorithm that compresses and decompresses digital audio data according to a given audio file or streaming media audio coding format. The algorithm can represent the high-fidelity audio signal with a minimum number of bits while retaining quality. The audio codec used can be based on audio compression algorithms, such as modified discrete cosine transform (MDCT) coding and linear predictive coding (LPC).

In some embodiments, transmitter 150 can be set to 10 different channels, with the 10th channel being an auto-scanning channel. In some embodiments, the transmitter can be an integrated signal distribution device that distributes various signals via multiple channels through an RF channel in which the headsets can connect to and produce sound via an end source device connected to the transmitter, such as through RCA audio input ports 622, 624, and/or wirelessly through Bluetooth mode (e.g., turned on by Bluetooth button 502).

Mic input port 514 can be used for direct input connectivity to a microphone. In many embodiments, transmitter 150 can include mic mixing functionality, which can attenuate (or reduce in level) a microphone that is not being addressed, and conversely, rapidly activate any microphone that is addressed by a talker.

USB-C port 626 can be used to as a factory service port and, in some embodiments, to receive direct source audio input. As a service port, USB-C port 626 can allow input from a control, such as a keypad that can control headset colors and/or can change and/or cycle through various color options on the headsets connected to the transmitter via RF signal, which can allow for user customization options and full control of LED color coding on the headsets. USB-C port 626 also can facilitate factory servicing. This type of port can be used to access programming and troubleshooting tools on transmitter 150, which in some embodiments can be used by an end user. USB-C port 626 can allow a technician to access functions, such as updating firmware and/or adjusting analog and/or Bluetooth output settings. USB-C port 626 also can be used to factory-reset the transmitter in the event none of the functions are working properly.

In many embodiments, transmitter 150 and headsets (e.g., 110) can provide real-time music integrations of users' track choices running parallel in multiple headsets for silent parties or discos. In some embodiments, the system can include headsets connected through selected channels, where each headset is playing similar audio files or independently playing audio files of choice, and/or each device is operatively coupled to a microphone (e.g., through mic input port 514). In some embodiments, transmitter 150 and headset 110 can provide an optimized communications application that allows a user to manage simultaneous voice and audio streams. The user of headset 110 can listen to the same playlists of music along with other users simultaneously, allowing users of headsets 110 to stay connected for hours while partying with a common host. A user of headset 110 can manage simultaneous audio streams transmitted from different transmitters 150. The user can listen to music, along with the other users, using a personal headset based on a channel selection from multiple channels. The transmitter can store integrated channels and music management artificial intelligence for selectively listening to music with a plurality of other users.

In a number of embodiments, transmitter 150 can provide direct-to-source Bluetooth capability, as the transmitter can be an integrated signal distribution device that distributes various signals via multiple channels through an RF channel to which the headsets can connect and produce sound via an end source device connected to the transmitter.

In many embodiments, transmitter 150 can provide an adaptive channel analyzing environment for selecting the RF channel with minimal interruptions. An adaptive codec in transmitter 150 can monitor the quality of the connection and/or surrounding radio environment, and/or can adjust its bitrate to provide a more consistent playback experience. For example, the aptX adaptive codec or another suitable codec can be used by the transmitter to monitor the surrounding radio environment. This audio coding technology can combine premium audio quality, low-bit rate audio transmission, low latency, and scalability to create a superior wireless listening experience for end users. The codec can be designed to automatically adjust to provide optimum audio quality or latency depending on what content is being played on the device, and/or take into account the external RF environment to provide robustness.

A silent disco is essentially a disco where people dance to music played through wireless headsets instead of loudspeakers, with transmitters transmitting music content to the wireless headsets. Silent disco-style events can be improve by supplementing them with communication enabled through headsets in conjunction with other audio sources. At silent discos, people generally cannot communicate without taking their headsets off. It is likely that this problem is a partial limitation to the success of silent disco in becoming a more mainstream establishment in nightclubs and bars around the world because one of the key reasons people go to bars and clubs is to socialize. Music is usually an important component of nightclubs and bars but often makes it difficult to communicate because of the need to speak over the music. Facilitating communication between people wearing headsets would likely help the silent disco concept to catch on and could help to popularize the concept of speaking while listening to music through headsets. In the context of bars and nightclubs, communication could be improved in several distinctive ways through the use of an improved silent disco concept.

There are many other types of events based on a concept similar to silent disco, such as silent theatre, silent disco pub crawls, group fitness events, and others. Any of these applications could be adapted and improved by enabling headset-based communication in addition to the other audio sources that are already being transmitted to the headsets wirelessly. The audio from this communication can be mixed with or separate from other audio. Generally speaking, music can still be transmitted via RF, the receiver being either built into the headsets or through a purpose-built accessory such as a transmitter, which can communicate with both a mobile phone and the headsets. Headsets 110 can be used along with, or in place of, other hardware to enable functionality with the software features. For example, headsets and/or other hardware combinations may include hardware and instrumentation such as gyroscopes, magnetometers, accelerometers, and GPS or RF or UHF.

In many embodiments, headsets 110 can be used, along with one or more transmitters 150, in the events such as concerts, weddings, festivals, parties, movie nights, conferences, silent discos, and/or other suitable events, with a population of many (e.g., more than 2000) participating members, with a single microphone providing voice to the live audience. Further, a single mic can pick up instruments and/or vocals with a more coherent and focused sound, thus preventing a blend of transients, because there are no phase cancellations with one microphone providing intimacy and raw detail. In some embodiments, headsets 110 can provide a direct link between the performer and listener during an event.

Figure 7:
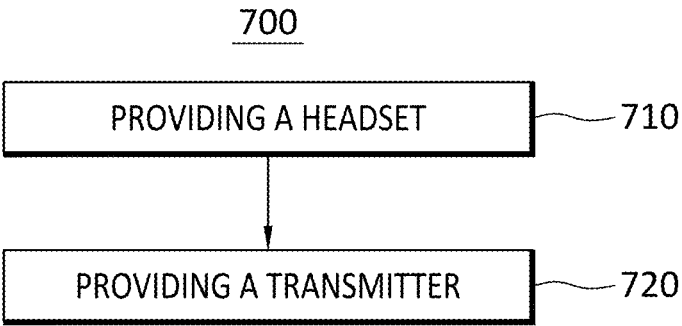
FIG. 7 illustrates a flow chart for a method of providing a system, according to another embodiment.

Turning ahead in the drawings, FIG. 7 illustrates a flow chart for a method 700. Method 700 can be a method of providing a system. The system can be similar or identical to system 100 (FIG. 1). Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped.

Referring to FIG. 7, method 700 can include a block 710 of providing a headset. The headset can be similar or identical to headset 110 (FIGS. 1-4B). The headset can include a left ear assembly and/or a right ear assembly. Left ear assembly can be similar or identical to left ear assembly 200b (FIG. 2), and right ear assembly can be similar or identical to right ear assembly 200a (FIG. 2). The headset can include a headband connecting the left ear assembly and the right ear assembly. The headband can be similar or identical to headband 202 (FIG. 2). The set can include a switch configured to toggle the headset between a first mode for receiving radio frequency (RF) broadcast signals and a second mode for receiving Bluetooth signals. The switch can be similar or identical to Bluetooth button 434 (FIG. 4A).

In a number of embodiments, method 700 also can include a block 720 of providing a transmitter configured to transmit RF broadcast signals. The transmitter can be similar or identical to transmitter 150 (FIG. 1, 5-6). The transmitter can include a channel selector configured to cycle between channels of the RF broadcast signals transmitted by the transmitter. The channel selector can be similar or identical to channel button 510 (FIG. 5).

In a number of embodiments, selecting one of the channels with the channel selector performs an auto-scan for a channel having a lowest interference among the channels. In several embodiments, the headset and the transmitter are configured to communicate over the RF broadcast signals using a phase-locked loop control system. In many embodiments, the transmitter can include a wired audio input (e.g., RCA audio input ports 622, 624) and a wireless Bluetooth input (e.g., turned on using Bluetooth button 502).

In several embodiments, the transmitter can include a microphone input, such as mic input port 514 (FIG. 5). In a number of embodiments, the transmitter can be configured to simultaneously transmit to the headset both audio received from the a voice stream received from the microphone input and one of the wired audio input or the wireless Bluetooth input. In various embodiments, the microphone input can be configured to activate when addressed and attenuate when not addressed. In some embodiments, the transmitter further can include a channel number display, such as channel display 512 (FIG. 5).

In many embodiments, the headset further comprises one or more LEDs configured to dynamically change color in the first mode based on sound received from the RF broadcast signals. The LEDs can be similar or identical to LED panels 208a,b (FIG. 2). In some embodiments, the one or more LEDs can be configured to display a controllable color in the second mode. In some embodiments, the transmitter can be configured to control the controllable color. In some embodiments, the headset can be configured to output spoken messages based on one or more statuses.

Although the systems and methods herein have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 7 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    a transmitter comprising a single wireless Bluetooth input, wherein the transmitter is configured to transmit, via radio frequency (RF) broadcast signals, audio received from the single wireless Bluetooth input; and
    a headset comprising:
        a left ear assembly;
        a right ear assembly;
        a headband connecting the left ear assembly and the right ear assembly; and
        a switch configured to toggle the headset between a first mode for receiving the RF broadcast signals from the transmitter and a second mode for receiving Bluetooth signals,
    wherein:
        the transmitter comprises a wired audio input;
        the transmitter further comprises a microphone input;
        the transmitter is configured to simultaneously transmit to the headset both audio received from a voice stream received from the microphone input and one of the wired audio input or the single wireless Bluetooth input;
        the microphone input is configured to activate when addressed and attenuate when not addressed;

the transmitter further comprises a channel number display;

the headset further comprises one or more LEDs configured to dynamically change color in the first mode based on sound received from the RF broadcast signals;

the headset is configured to output spoken messages based on one or more statuses;

the transmitter comprises a channel selector configured to cycle between channels of the RF broadcast signals transmitted by the transmitter;

the channel selector is configured to select one of the channels by performing an auto-scan for a channel having a lowest interference among the channels;

the headset and the transmitter are configured to communicate over the RF broadcast signals using a phase-locked loop control system;

the one or more LEDs are configured to display a controllable color in the second mode; and the transmitter is configured to control the controllable color.

2. The system of claim 1, wherein the one or more statuses comprise at least one of:

a function being played;

a channel number;

a power status;

a Bluetooth power status;

a Bluetooth pairing status; or a Bluetooth connectivity status.

3. The system of claim 1 further comprising:

a plurality of the headset, wherein the transmitter is configured to transmit the RF broadcast signals to each of the plurality of the headset.

4. A method comprising:

providing a transmitter comprising a single wireless Bluetooth input, wherein the transmitter is configured to transmit, via radio frequency (RF) broadcast signals, audio received from the single wireless Bluetooth input;

providing a headset, wherein the headset comprises:

a left ear assembly;

a right ear assembly;

a headband connecting the left ear assembly and the right ear assembly; and a switch configured to toggle the headset between a first mode for receiving the RF broadcast signals from the transmitter and a second mode for receiving Bluetooth signals; and transmitting, from the transmitter via the RF broadcast signals to the headset, the audio received at the single wireless Bluetooth input of the transmitter, wherein:

the transmitter further comprises a channel number display;

the headset further comprises one or more LEDs configured to dynamically change color in the first mode based on sound received from the RF broadcast signals;

the headset is configured to output spoken messages based on one or more statuses;

the one or more LEDs are configured to display a controllable color in the second mode; and the transmitter is configured to control the controllable color.

5. The method of claim 4, wherein:

the transmitter comprises a channel selector configured to cycle between channels of the RF broadcast signals transmitted by the transmitter; and the channel selector is configured to select one of the channels by performing an auto-scan for a channel having a lowest interference among the channels.

6. The method of claim 4, wherein:

the headset and the transmitter are configured to communicate over the RF broadcast signals using a phase-locked loop control system.

7. The method of claim 4, wherein:

the transmitter comprises a wired audio input;

the transmitter further comprises a microphone input;

the transmitter is configured to simultaneously transmit to the headset both audio received from a voice stream received from the microphone input and one of the wired audio input or the single wireless Bluetooth input; and the microphone input is configured to activate when addressed and attenuate when not addressed.

* * * * *